United States Patent [19]
Nishibe

[11] Patent Number: 5,155,347
[45] Date of Patent: Oct. 13, 1992

[54] OBJECT DETECTOR FOR AN OPTICAL INSTRUMENT

[75] Inventor: Takashi Nishibe, Kanagawa, Japan

[73] Assignee: Fuji Electric Co, Ltd., Kanagawa, Japan

[21] Appl. No.: 736,636

[22] Filed: Jul. 26, 1991

[30] Foreign Application Priority Data

Aug. 1, 1990 [JP] Japan .................. 2-204636

[51] Int. Cl.$^5$ .............................. G01J 1/20
[52] U.S. Cl. ..................... 250/201.8; 354/408
[58] Field of Search ............. 250/201.8; 354/406, 354/407, 408

[56] References Cited

U.S. PATENT DOCUMENTS 4,812,869  3/1989  Akashi et al. ............. 250/201.8
4,904,855  2/1990  Nishibe et al. ............ 250/201.8

FOREIGN PATENT DOCUMENTS 60-15506   1/1985  Japan .
61-120001  6/1986  Japan .

*Primary Examiner*—David C. Nelms
*Assistant Examiner*—K. Shami
*Attorney, Agent, or Firm*—Finnegan, Henderson, Farabow, Garrett and Dunner

[57] ABSTRACT

An object detector for an optical instrument that is suitable for detecting an object of image pickup in the case of the automatic focusing of the optical instrument such as a camera. The object detector is capable of selecting or adjusting angles of oblique direction with respect to the optical axis easily to detect an object.

12 Claims, 5 Drawing Sheets

FIG. 6
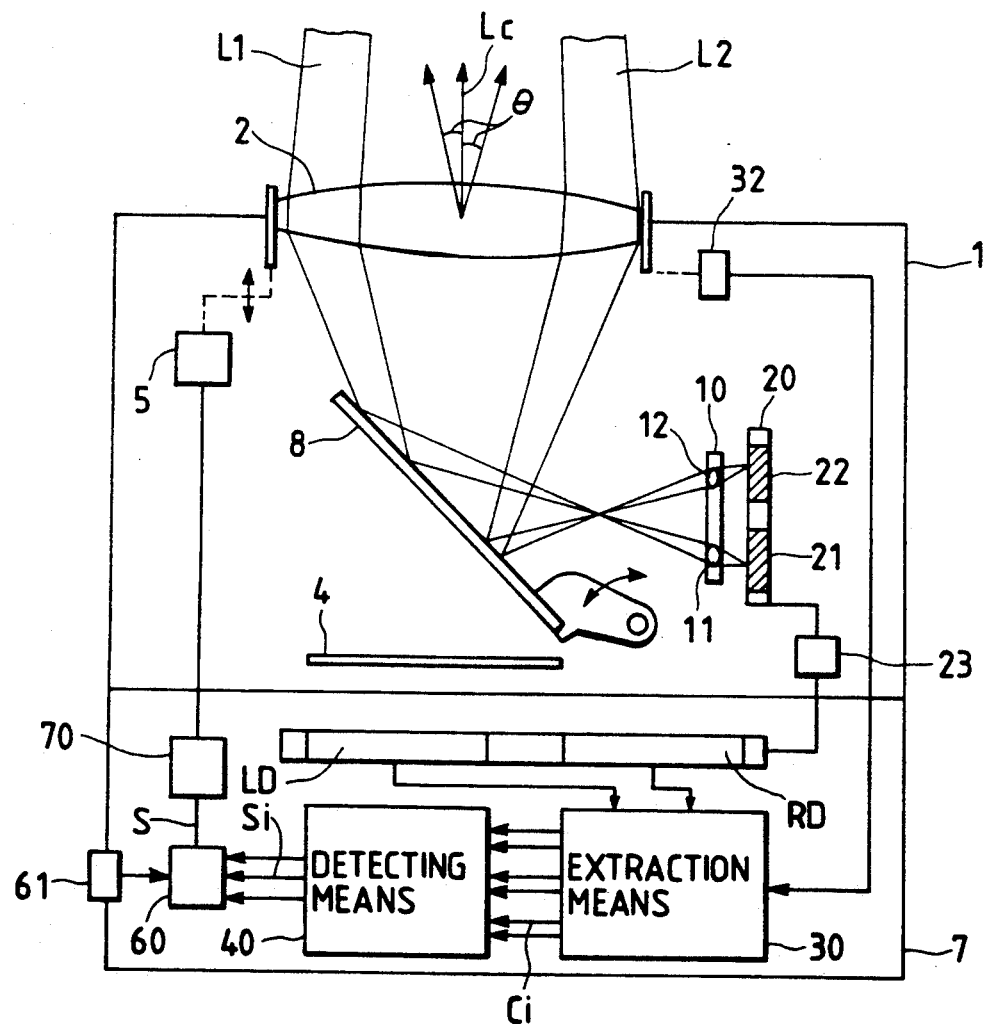
FIG. 7(a)
FIG. 7(b)
FIG. 7(c)
FIG. 7(d)
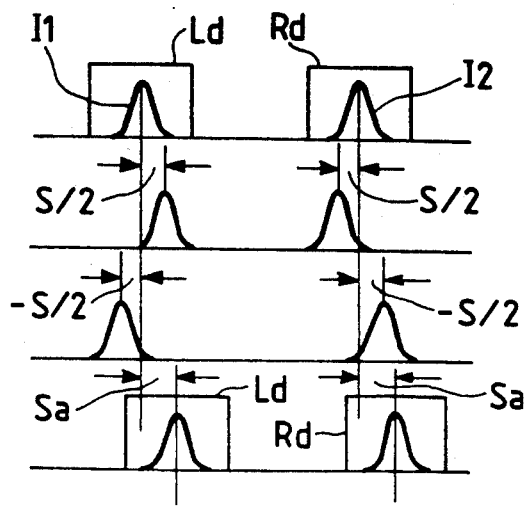

OBJECT DETECTOR FOR AN OPTICAL INSTRUMENT

BACKGROUND OF THE INVENTION

1. Field of the Invention

The present invention relates to an object detector for an optical instrument that is suitable for detecting an object of image pickup in the case of the automatic focusing of the optical instrument, such as a camera, etc.

2. Discussion of the Related Art

As an automatic focusing system for an optical instrument such as a camera, etc., a so-called passive system for catching the image of an object or subject bathed in natural light or illumination light to adjust the focus of an image-pickup lens corresponding to the condition thereof has particularly attracted public attention in recent years. The passive system attains a higher focusing accuracy and consumes less electric power than a so-called active system for projecting pulses of infrared light or the like to an object to adjust the focus of an image-pickup lens according to the distance to the object detected on the basis of the turnaround time of the pulses. The practical use and spread of the passive system has been developed rapidly. As is well-known in the art, the passive systems may be roughly classified into two types: (1) a triangular surveying system for detecting the distance to an object on the basis of so-called outside light without use of the image-pickup lens, and (2) a TTL (Through The Lens) system for detecting the difference of the focusing condition on the basis of inside light passing through the image-pickup lens.

The basic principles of the outside light triangular surveying system will now be described in brief with reference to FIG. 8. In FIG. 8, a pair of small lenses 11 and 12 are disposed in an optical instrument as an optical means for catching the image of an object A. The pair of small lenses 11 and 12 are separated by a base line length b, receiving light from the object A through different optical paths L1 and L2. Images I1 and I2 of the object A are formed respectively in the illustrated positions on image sensors 21 and 22 placed at the focal lengths f of lenses 11 and 12. When the object A is infinitely distinct from the optical instrument, the positions of the images I1 and I2 are respectively at the intersection of an optical axis Lc, passing through the centers of the lenses 11 and 12, and image sensors 21 and 22. When the object A approaches the optical instrument, however, the positions of images I1 and I2 are respectively shifted by the distances designated by s1 and s2 in the drawing in reverse directions from such original positions.

Assuming that the distance from the lenses 11 and 12 to the object A is x and that the optical axis passing through the object A separates the base line length b into b1 and b2, the following expression should hold true because a right-angled triangle with sides x and the base line length part b1 is similar to a triangle with sides of focal length f and the shift amount s1.

$$b1/x = s1/f$$

The following expression should apply in the same manner as described above.

$$b2/x = s2/f$$

Assuming that the relation between s1 and s2 is expressed by $s = s1 + s2$, the following expression results from the relation between b1 and b2 expressed as $b = b1 + b2$.

$$b/x = s/f$$

Accordingly, if the sum s of the shift amounts s1 and s2 from the respective original positions of the images I1 and I2 is detected by any means, the distance x can be determined as follows.

$$x = bf/s$$

Because the images I1 and I2 of the object A are not points but always have some patterns, the shift amount s is detected by using, as patterns, image data groups obtained by collecting image data expressing the intensity of light applied to respective photosensors within the left and right image sensors 21 and 22. The number S of shifts required for adjusting the image patterns is measured while successively shifting the two image data groups one by one relative to the infinite distance reference points.

The shift amount s can be calculated by multiplying this number S of shifts by the pitch of arrangement of the photosensors within the image sensors. Accordingly, the focus of the optical instrument can be adjusted to the object A by calculating the distance x on the basis of the shift amount s according to the aforementioned expression and adjusting the image-pickup lens to a focusing position corresponding to the distance x. In practical use, the position of the image-pickup lens of the optical instrument is adjusted by the number S of shifts to save the time required for calculating the shift amount s and the distance x.

The aforementioned image data may be digital data, for example, of 4-8 bits, so that in most cases the left and right image data groups do not perfectly accord with each other when the number S of shifts is measured. Therefore, in general, the number S of shifts representing a maximum correlation is detected by successively examining correlations between the two image data groups according to a suitable evaluation function while shifting the respective image data groups. Furthermore, if a shift value S as a decimal, instead of the number of S shifts as an integer, is calculated by using an interpolation technique in which the maximum correlation is detected by reference to evaluation function values and the surrounding values, the focusing accuracy in the optical instrument may be greatly improved.

Where the view field examined to detect the object is so wide that a plurality of objects enter into the field, narrowing of the field may be necessary for accurate focusing because the object to be detected may be undetermined. When the view field is narrowed, however, the picture thus obtained may be out of focus because the optical instrument 1 may detect an infinite background in the direction of the optical axis Lc if the instrument is aimed at a middle position between two objects A1 and A2 as shown in FIG. 9. This may occur, for example, where two persons are standing side by side.

To solve the disadvantage caused by a so-called center spoiling phenomenon such as this, without the necessity of widening the view field for detection of the object, a technique for detecting the distance to an object in an oblique direction with respect to the optical axis (see Japanese Patent Unexamined Publication Nos. Sho-60-15506 and Sho-61-120001) as proposed in the present invention can be utilized.

By using such an oblique-direction distance measuring technique, distances to an object can be detected in several directions (for example, three directions) including the direction of the optical axis Lc and oblique directions making an angle α with respect to the optical axis while the direction of the finder of the optical instrument is fixed as shown in FIG. 10. The optimum object to photograph can then be selected from the three detection results to adjust the focus of the optical instrument. In the conventional so-called three-point distance measuring technique, however, the inclination angle α is generally fixed because it is difficult to adjust. Accordingly, the technique is effective only in the case where the position of the object is aligned with the fixed oblique directions of view.

SUMMARY OF THE INVENTION

The present invention has been made in view of the above circumstances and has as an object to provide an object detector in which angles of oblique direction with respect to the optical axis can be easily selected or adjusted to detect an object.

A further object of the present invention is to provide an object detector for detecting an object in three directions including a front direction and variable oblique directions, which is suitable for optical instruments such as a triangular surveying system automatic focusing camera, and a TTL system automatic focusing camera.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the object detector for an optical instrument of this invention comprises a pair of optical means for receiving light from an object in a view field of the optical instrument through different optical paths so as to form a pair of images of the object, an image sensor means for receiving the pair of object images formed by the pair of optical means and for producing a pair of image data groups corresponding to the pair of object images, an extraction means for respectively extracting from the pair of image data groups a pair of partial groups, corresponding to partial view fields respectively having inclination angles with respect to an optical axis of the optical instrument, and a detection means for detecting a shift value representing a maximum correlation by examining respective correlations while successively relatively shifting image data in the pair of partial groups extracted by the extraction means, and in which the shift value detected by the detection means while arbitrarily designating inclination angles of partial view fields to extract the pair of partial groups in the extraction means is detected as an index representing the attribute of the object contained in the respective partial view field with an inclination angle designated.

The object detector suitable for the triangular surveying system comprises: in combination with the optical means, the image sensor means and the detection means which are the above-mentioned constituent components, an extraction means for extracting, from the pair of image data groups generated by the image sensor means, three pairs of partial groups corresponding to partial view fields in the direction of an optical axis of the optical instrument and in directions making positive and negative inclination angles with respect to the optical axis. A detection means computes shift values corresponding to the three pairs of partial groups, while designating inclination angles for the extraction means of the partial view fields relative to the optical axis. The shift values and inclination angles are used as indexes representing distances from the optical instrument to the object contained in the respective partial view fields corresponding to the respective pairs of partial groups.

The object detector suitable for the TTL system is comprised of the optical means, the image sensor means, and the detection means which are the same as those for the triangular surveying system. Shift values are similarly detected by the detection means corresponding to the three pairs of partial groups while inclination angles are designated with respect to the optical axis of the partial view fields for the extraction means and are used as indexes representing focusing conditions of the image-pickup lens of the optical instrument with respect to the object contained in the partial view fields.

In any one of these object detection means, it is simplest and most advantageous to use a pair of lenses arranged at a predetermined distance as the pair of optical means. The image sensor means may comprise a pair of image sensors corresponding to the pair of optical means or it may comprise a single image sensor used in common by the pair of optical means. In any case, it is preferable that image data from the respective photosensors are generated in the form of digital data composed of a plurality of bits. It is also advantageous to provide the extraction means and the detection means in the form of software in a microcomputer generally incorporated in the optical instrument. Further, it is preferable that the pair of partial groups extracted by the extraction means have equal quantities of image data.

In either the triangular surveying type object detector or the TTL type object detector, the inclination angles (with respect to the optical axis) of oblique partial view fields used by the extraction means may be designated to have equal values with respect to the positive and negative directions. In the TTL type object detector, it is advantageous to designate the inclination angles according to the focal length of the image-pickup lens of the optical instrument or according to the zoom rate when the image-pickup lens comprises a zoom lens.

Operation of the present invention will now be described in the order of its constituent means.

The pair of optical means receive light from an object through different optical paths, producing a pair of object images on the image sensor means. A pair of image data groups representing the patterns of the respective object images are generated from the image sensor means. In this invention, the quantity of image data in each image data group is established to be sufficiently large to widen the view field compared with that of conventional optical instruments.

The extraction means extracts partial groups from the pair of image data groups to form pairs of partial groups. The view field angles of partial view fields for the object are established by selecting the respective numbers of image data in the partial groups. The extraction means is designed in a manner so that the inclination angles (with respect to the optical axis of the optical instrument) of the partial view fields correspond to the positions in which the partial groups are extracted from the image data groups. Accordingly, in the present invention, an object in the partial fields having narrow view field angles can be individually detected while the inclination angles are changed.

Next, the detection means detects the object from the pair of partial groups extracted by the extraction means corresponding to the partial view fields having the inclination angles designated as described above. The detection means examines correlations while successively shifting image data in the partial groups, as in the conventional technique, and detects the object by determining the shift value that represents the maximum correlation as a result of the examination. This shift value is used as an index representing the attribute of the object contained in the respective partial view field. For example, in the triangular surveying system, the shift value is used as an index representing the distance from the optical instrument to the object as described above. In the TTL system, the shift value is used as an index representing the focusing condition of the image-pickup lens with respect to the object.

As described above, the object can be detected with discrimination for the respective partial view field while designating the inclination angles of the partial view fields to detect the object for the extraction means and while arbitrarily designating the view field angles thereof if necessary. In either the triangular surveying system or the TTL system, an object can be detected within three partial view fields having the direction of the optical axis of the optical instrument and directions making variable positive and negative inclination angles with respect to the optical axis. Accordingly, the present invention eliminates such difficulties as the aforementioned center spoiling phenomenon, greatly improving the focusing accuracy of the optical instrument.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 6 illustrates an embodiment of a TTL type optical instrument;

FIGS. 7(a) through 7(d) represent object images in the embodiment;

DESCRIPTION OF THE PREFERRED EMBODIMENTS

Figure 1:
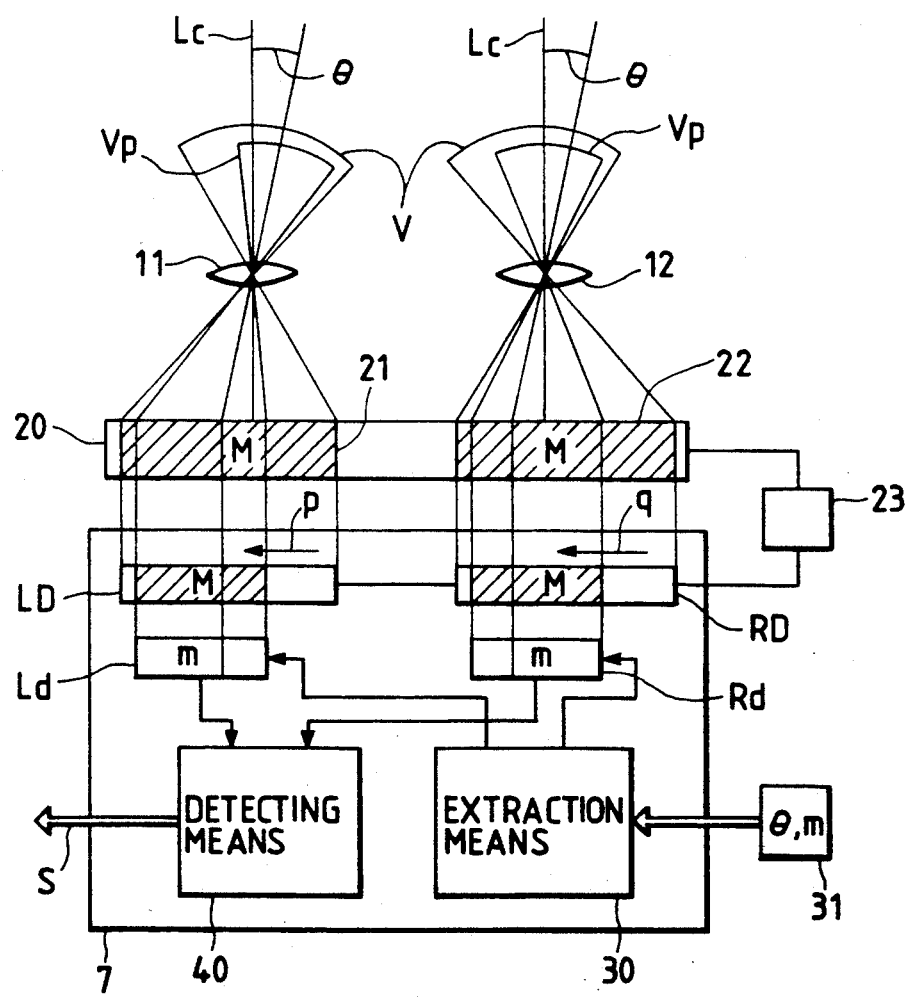
FIG. 1 illustrates the basic embodiment of an object detector in an optical instrument according to the present invention.

Reference will now be made in detail to the presently preferred embodiments of the invention with reference to the drawings. FIG. 1 illustrates the configuration of a basic embodiment of an object detector in an optical instrument according to the present invention.

Figure 8:
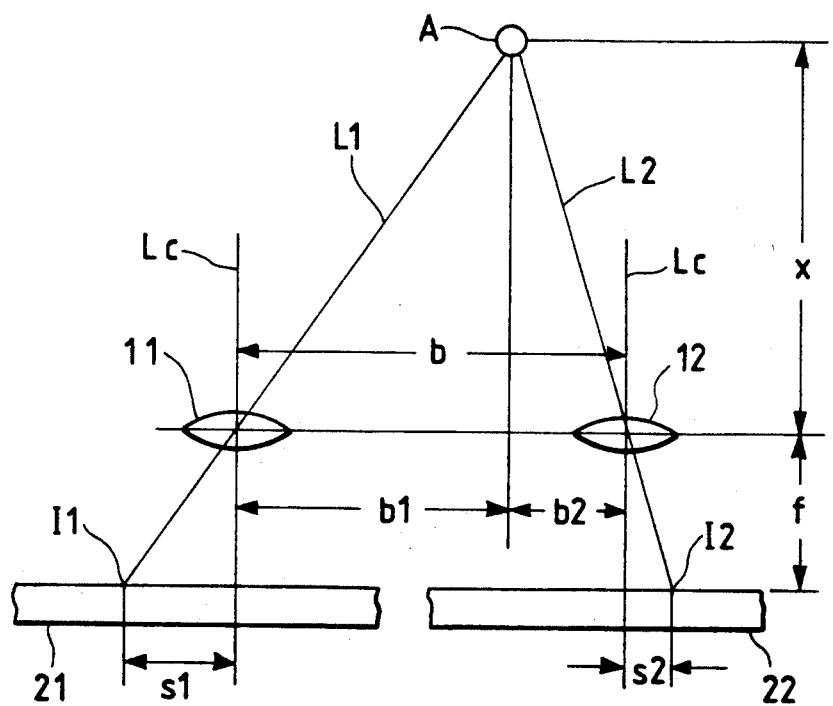
FIG. 8 illustrates the relative positions of an object, a pair of optical means and an image sensor means showing the theory of triangular surveying.
Figure 9:
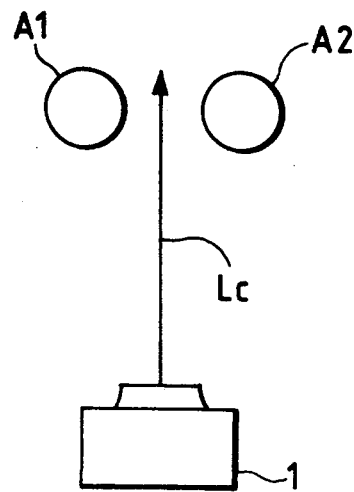
FIG. 9 illustrates the relative positions of an optical instrument and an object.
Figure 10:
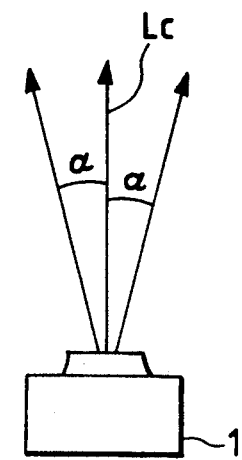
FIG. 10 illustrates the optical instrument and the direction of object detection.

A pair of optical means 11 and 12 shown in the upper portion of FIG. 1 are, for example, comprised of small lenses. The optical means 11 and 12 receive light from an object which exists in the upper part not shown, through different light paths in the same manner as shown in FIG. 8, and respectively form object images on image sensor means 20. In this embodiment, one image sensor means 20 which, for example, may be comprised of a photodiode array or a CCD image sensor, contains image sensor portions 21 and 22, each of which is composed of M photosensors for receiving an object image. The angle formed by each of these portions 21 and 22 with respect to the centers of the corresponding optical means 11 and 12 is the view field V of the optical instrument. For example, in this embodiment, a pair of image data groups LD and RD generated by the image sensor means 20 are read into the RAM of a microcomputer 7 incorporated in the optical instrument through an A/D converter 23.

Each of the two image data groups LD and RD has M image data corresponding to each of the aforementioned image sensor portions 21 and 22. For example, each of the image data is a digital data composed of 4–8 bits. Hereinafter, image data in the image data groups LD and RD are respectively expressed as Lp and Rp by using variables p and q each of which changes in a range of 1 to M.

In this embodiment, the extraction means 30 and the detection means 40 are provided in the form of software in the microcomputer 7. The operation of the extraction means 30 and the detection means 40 is now described in brief, though an example of their operation will be described in detail later with reference to FIG. 5. The extraction means 30 extracts partial groups Ld and Rd of m (m<M) image data from the left and right image data groups LD and RD to define a partial view field Vp having an inclination angle $\theta$ with respect to the optical axis Lc as shown in the drawing. As illustrated in the drawing, the inclination angle $\theta$ and the view field angle of the partial view field Vp can be designated respectively on the basis of the positions of the partial groups Ld and Rd extracted from the image data groups LD and RD and on the basis of the number m of image data in the respective partial group. For example, these values are set for the extraction means 30 by a setter 31 as shown in the drawing.

Figure 2:
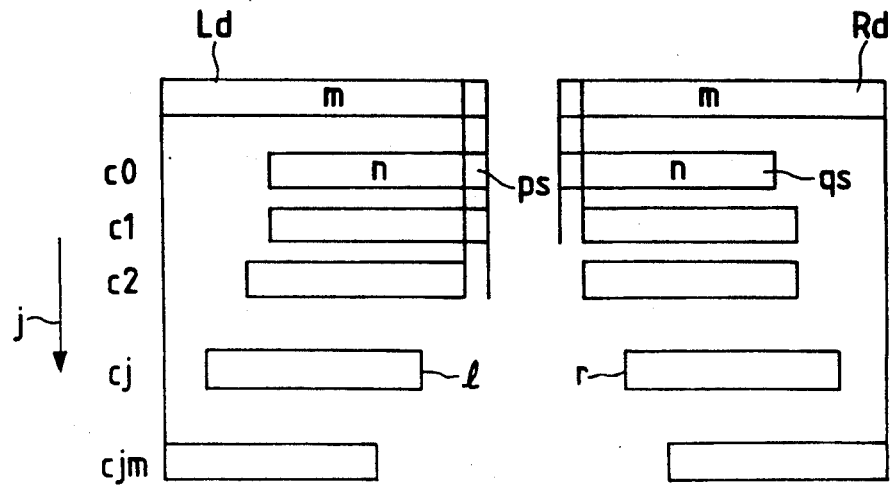
FIG. 2 is a representation of partial groups and small partial groups for explaining the operation of the detection means of the present invention.

The detection means 40 examines correlations while successively relatively shifting image data in the two partial groups Ld and Rd extracted by the extraction means 30 and detects the object in the form of a shift value S representing a maximum correlation as a result of the examination. The procedure is illustrated in FIG. 2. That is, the detection means 40 picks up small partial groups l and r of n (n<m) image data from the partial groups Ld and Rd of m image data as shown in the upper portion of the drawing, while successively shifting image data one by one to form a combination cj (j=0−jm). Whenever the combination cj is formed, the detection means 40 examines the correlation between the image data of the small partial groups 1 and r. The variable j represents the number of shifts for shifting the partial groups Ld and Rd. The maximum value jm of the variable j is 2(m-n).

For example, the evaluation function for examining correlations can be obtained by adding n times the absolute value of the difference between corresponding image data of the small partial groups 1 and r in the respective combination cj. In this case, a maximum correlation is obtained when the value of the evaluation function is smallest. The value of the variable j corresponding to the maximum correlation is outputted as a shift value S from the detection means 40.

An embodiment of the present invention applied to the triangular surveying system is now described with reference to FIG. 3. The optical instrument 1 is shown here as a simple lens shutter camera having a shutter 3 incorporated in an optical system including an image-pickup lens 2. After the image-pickup lens 2 of the optical instrument 1 is adjusted to focus on a desired object by actuating the lens according to the distance determined by the detector of the present invention, the shutter 3 is opened to expose the film 4 to light. An encoder 6 mechanically connected to the image-pickup lens 2 detects the current position of the lens.

Lenses 11 and 12 are the pair of optical means of the object detector according to the present invention, and are fixed to the case of the optical instrument 1. In this embodiment, the lenses 11 and 12 form object images from the view field on a pair of image sensors 21 and 22 that correspond to the lenses. The detection outputs of the two image sensors 21 and 22 are respectively channelled through the A/D converters 23 and are read as image data groups LD and RD into the RAM of the microcomputer 7 incorporated in the optical instrument.

Figure 4:
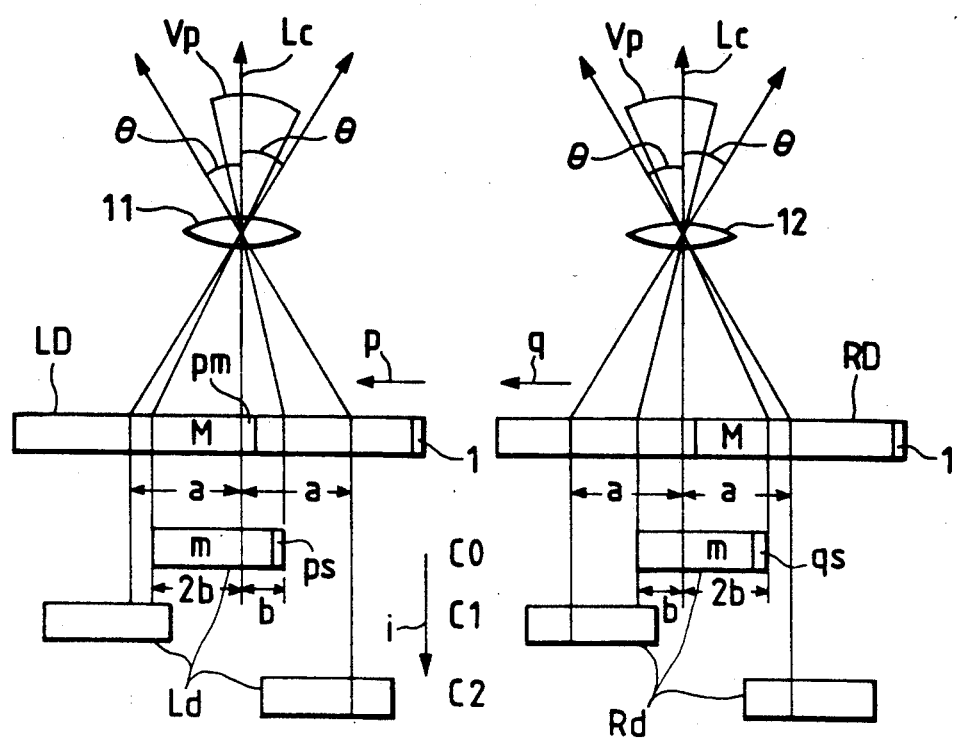
FIG. 4 is a representation of image data groups and partial groups for explaining the operation of the extraction means of the present invention.

In this embodiment, the extraction means 30 forms three partial groups by extracting, from the image data groups LD and RD, partial groups corresponding to the partial view fields having the direction of the optical axis of the optical instrument 1 and two directions making positive and negative inclination angles θ with respect to the optical axis. The operation is illustrated in FIG. 4, where image data groups LD and RD of M image data are shown corresponding to the lenses 11 and 12. The extraction means 30 extracts three pairs or three combinations C0-C2 of left and right partial groups Ld and Rd from the left and right image data groups LD and RD as shown in the lower portion of the drawing. Each of the partial groups Ld and Rd has m image data to determine the partial view field Vp. In this embodiment, m is fixed to be 18.

The combination C0 of the left and right partial groups corresponds to the partial view field having the direction of the optical axis Lc. The combinations C1 and C2 of the left and right partial groups correspond to the partial view fields having respectively directions making positive and negative inclination angles θ with respect to the optical axis. The angle θ is set for the extraction means 30 by the setter 31 as shown in FIG. 3. For the convenience of description, the three combinations of partial groups are hereinafter expressed as Ci by using a variable i in a range of 0 to 2.

The detection means 40 receives the three combinations of left and right partial groups Ld and Rd, examines the correlation between left and right partial groups for each combination Ci, and outputs the number S of shifts as a result of the examination of a maximum correlation.

Figure 5:
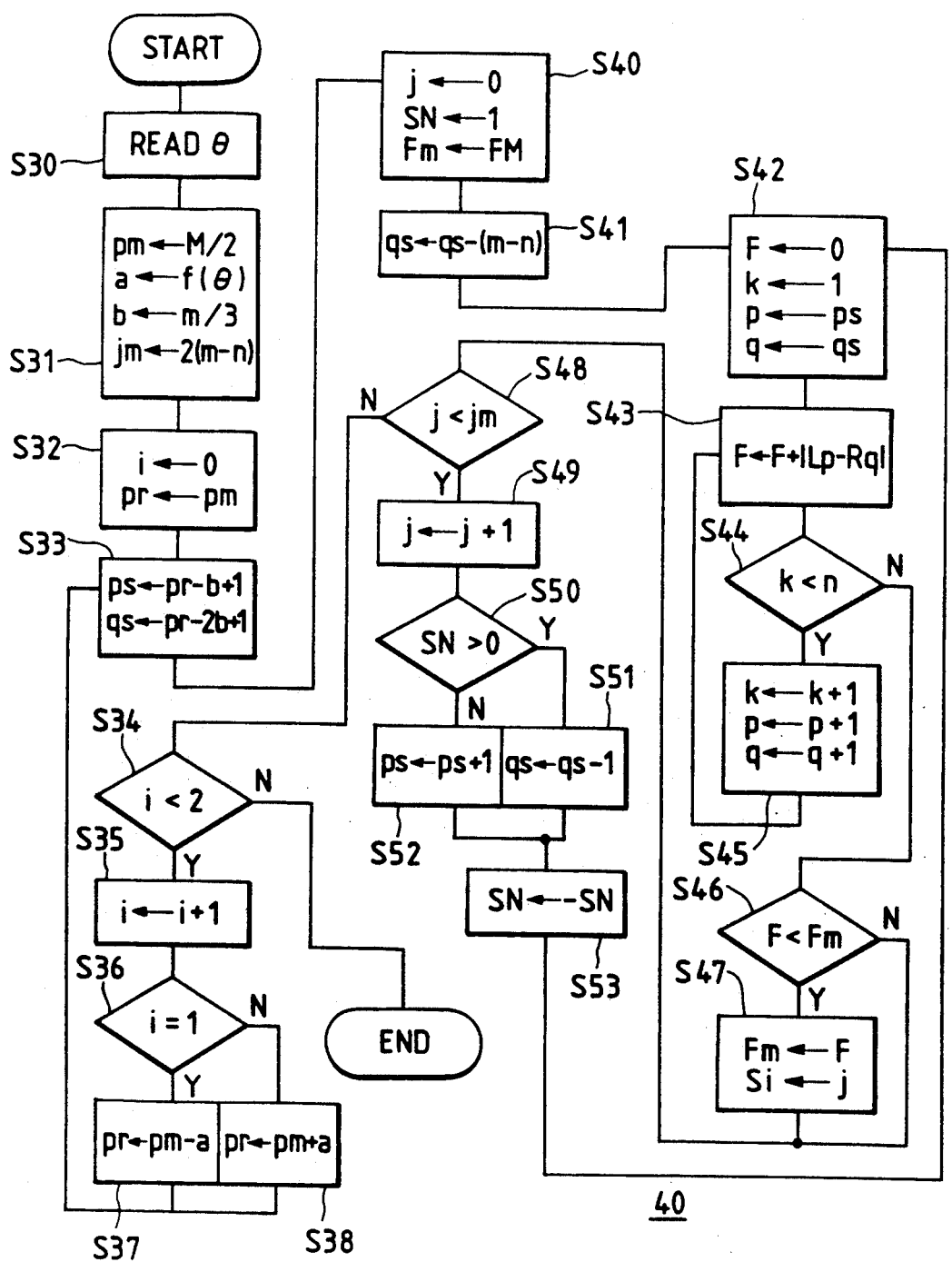
FIG. 5 is a flow chart illustrating an example operation of the extraction means and the detection means.

The following is a detailed description of the operation of the extraction means 30 and the detection means 40 in this embodiment referring to the flow chart of FIG. 5. The operation of the extraction means 30 is shown in the first column and the operation of the detection means 40 is shown in the second and third column.

Figure 3:
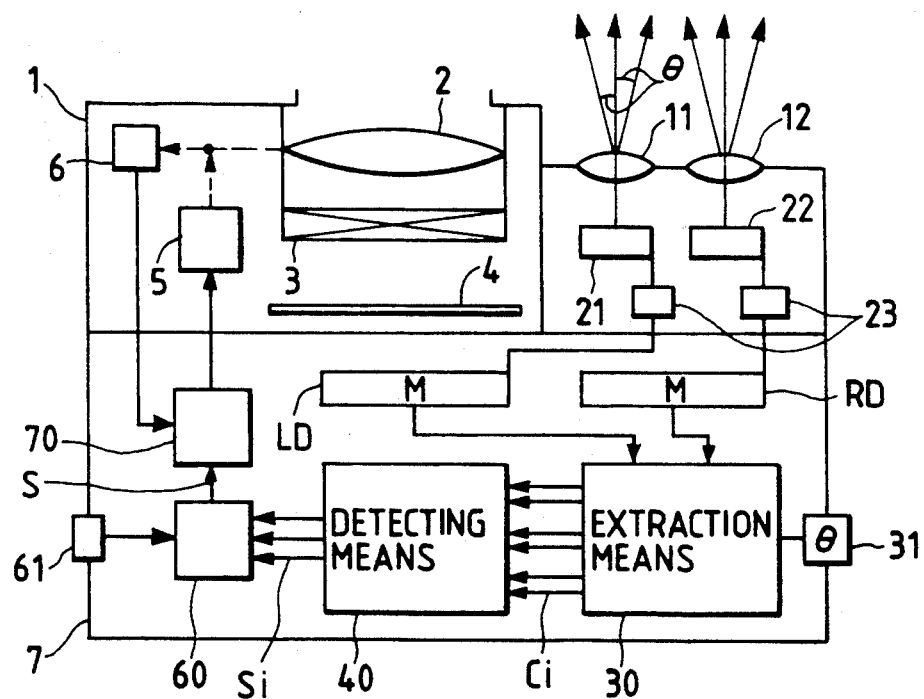
FIG. 3 illustrates an embodiment of a triangular surveying type optical instrument.

In the initial step S30 of the extraction means 30, a set value of the inclination angle θ is read from the setter 31 in FIG. 3. In the next step S31, the image data number pm in the center of image data group LD is calculated by dividing the number M of image data by 2. In this embodiment, M is an even number of about 100. Accordingly, the image data represented by the number pm is rightward adjacent to the center of the image data group. Further, in step S31, the number a of data shifts required for shifting the position of extraction of partial groups in the combination C1 or C2 in FIG. 4 (corresponding to the aforementioned inclination angle θ) from the position of extraction of partial groups in the combination C0 is calculated by the predetermined function f of the angle θ.

As shown in FIG. 4 regarding the combination C0, a reference point in the partial group Ld corresponding to the optical axis Lc establishes the left-side partial group Ld at a one-third right position as represented by the separation into b and 2b in the drawing. This positioning of partial group Ld corresponds to the partial view field Vp, which in turn amounts to viewing along the optical axis Lc. A reference point in the right-side partial group Rd is set to a one-third left position. Therefore, in step S32, the value b is calculated by dividing the number of image data in the respective partial groups by 3. The step S31 is terminated after the aforementioned maximum value jm of the variable j representing the combination number of the small partial groups 1 and r in FIG. 2 is calculated for the purpose of operating the detection means 40. The number n of image data in the respective small partial groups is set to two-thirds the number m of image data in the respective partial groups (12 in this embodiment), so that the aforementioned maximum value jm is 12 (2(m-n)).

In the next step S32, the variable i representing the combination number in FIG. 4 is set to 0 and the value of data number pm in the center of the image data group is assigned to the variable pr representing the reference data number. Further, in step S34, the lead data numbers ps and qs of the partial groups Ld and Rd in FIG. 4 are calculated respectively according to the equations ps=pr−b+1 and qs=pr−2b+1.

The flow of operation next proceeds to the detection means 40. In the initial step S40, the number of shifts required for shifting image data in the partial groups Ld and Rd for the purpose of examination of correlation is initially set to 0 by setting the variable j representing the combination number of the small partial groups in FIG. 2 to 0. Further, the sign variable SN for successively alternately shifting the left and right small partial groups l and r is set to 1 and the minimum evaluation function value Fm is set to an initial value that is sufficiently large. In the next step S41, the lead data number of the rightside small partial group r is obtained by subtracting m-n from the lead data number qs of the right-side partial group Rd in FIG. 2. The lead data number ps of the left-side partial group Ld is used directly as the lead data number of the left-side small partial group l.

Starting with step S42, the evaluation function for examination of correlation is calculated. In step S42, a preparation for the calculation is made. The evaluation function value F is initially set to 0; the variable k representing the data numbers in the small partial groups l and r in FIG. 2 is assigned the value 1; and the data number variables p and q are set to the lead data numbers ps and qs, respectively.

Next, in step S43 the evaluation function is calculated. In this embodiment, the absolute value of the difference between corresponding image data Lp and Rq in the small partial groups l and r is sequentially added to the evaluation function value F. In the next step S44, a determination is made as to whether the data number variable k has reached the number n of image data in the small partial group. If the variable k has not reached the number n, the calculation of the evaluation function value F is continued by returning the flow of operation to step S43 after the values of the variables k, p and q are respectively incremented by one.

When the calculation of the evaluation function value F in a certain combination cj of left and right small partial groups of FIG. 2 is completed so that the value of the data number variable k equals n, the flow escapes from the operation loop and advances from step S44 to step S46. In step S46, a determination is made as to whether or not the evaluation function value F thus calculated is smaller than the minimum evaluation function value Fm. If F is not smaller, the flow proceeds to step S48. If F is smaller, the minimum evaluation function value Fm is replaced by the evaluation function value F and, at the same time, the current value of the small partial group combination number j in FIG. 2 is stored as a shift value Si corresponding to the partial group combination number i in FIG. 4.

Thereafter, the flow of operation advances to step S48. In this step, a determination is made as to whether the small partial group combination number variable j has reached its maximum value jm. If the variable l has not reached its maximum value, the value of the variable l is increased by one in step S49. In the next step S50, the flow of operation divides, continuing in one of two possible directions depending upon the sign variable SN (positive or negative) to alternately shift the left and right small partial groups l and r in the manner of FIG. 2. If the sign variable SN is positive, the value of the lead data number qs of the right-side small partial group r is decreased by one in step S51. If the sign variable is negative, the lead data number ps of the left-side small partial group l is increased by one in step S52. In any case, the sign variable SN is switched over between positive and negative in step S53. Thereafter, the flow of operation returns to step S42 for calculation of the next evaluation function value F.

When the value of the small partial group combination number variable j reaches its maximum value jm by repeating the aforementioned operation while increasing the variable j, the examination of correlation in all combinations of the left and right small partial groups l and r in FIG. 2 is completed. The shift value resulting from the examination of a maximum correlation is stored as the aforementioned value Si corresponding to the value of the partial group combination number i.

At the same time, the operational flow continues from step S48 to step S34 of the extraction means 30 to compare the value of the partial group combination number variable i with its maximum value 2. When the variable i is smaller than 2, the flow advances to step S35 and the value of the variable i is incremented by one. In the next step S36, the direction of flow is dependent upon the value of the variable i. When the value of the variable i is 1, the reference data number pr of the partial group to be extracted next is set by subtracting the data number a required for shifting the position of extraction of the aforementioned partial group from the center data number pm of the image data group in step S37. When the value of the variable i is 2, the reference data number pr of the partial group to be extracted next is set by adding the data number a to the center data number pm of the image data group in step S38. Thereafter, the flow goes back to the step S33, in which the same operation as described above is repeated for the partial group combination corresponding to the increased variable i.

When the aforementioned operation for all of the three combinations C0 to C2 of partial groups Ld and Rd shown in FIG. 4 is completed, the flow escapes from the operation loop at step S34. At this point, all of the operations of the extraction means 30 and the detection means 40 have been completed.

Going back to FIG. 3, the object specifying means 60 receives, from the detection means 40, shift values Si representing the distances to objects respectively detected in the three combinations Ci (i=0 to 2) of the left and right partial groups Ld and Rd in FIG. 4 extracted from the left and right image data groups LD and RD by the extraction means 30. One of the three shift values is selected within the object specifying means 60 according to the specifying standard designated by the setter 61 to thereby specify a corresponding object. Various standards can be used as the specifying standard corresponding to the desired result. As a simple example, the nearest of the objects in the three partial view fields having the direction of the optical axis Lc and two directions of inclination angles $\theta$ may be selected or, in other words, the object with the maximum shift value Si may be specified. In practical use, a plurality of specifying standards may be encoded so that one standard can be temporarily selected by the setter 61.

The object specifying means 60 outputs the shift value S corresponding to the specified object, so that the image-pickup lens control means 70 receives the shift value S and controls the position of the image-pickup lens 2 through the actuator 5 to match the detection value of the encoder 6 with the shift value S to thereby adjust the focus of the optical instrument 1 to the specified object.

FIG. 6 depicts an embodiment in which the present invention is applied to the TTL type automatic focusing camera. This type optical instrument 1 catches an object image from inside light through the image-pickup lens 2. In general, a focal-plane shutter is used in a single-lens reflex camera or the like. In this embodiment, a shutter 8 covering a film 4 is so tilted as to serve as a mirror deflecting the inside light. A pair of lenses 11 and 12 comprising the optical means 10 receive light from the object through reflection at the mirror as shown in the drawing and through light paths L1 and L2 in different portions of the image-pickup lens 2 and form object images on image sensor portions 21 and 22 of a single image sensor means 20.

In the same manner as in the previous embodiment, the image detection outputs of the image sensor means 20 are read as a pair of image data groups LD and RD in the microcomputer 7 through the A/D converter 23. The extraction means 30, the detection means 40, the object specifying means 60 and the image-pickup lens control means 70 are incorporated in the form of software in the microcomputer 7. The actuator 5 for actuating the position of the image-pickup lens 2 is provided for in the same manner.

In this well-known TTL technique, the focusing condition of the optical instrument 1 is detected on the basis of the shift amount from the reference positions of the pair of images received by the image sensor 20, so that the image-pickup lens 2 is controlled to eliminate the shift. FIG. 7 shows conditions in which object images I1 and I2 are respectively received by the image sensor portions 21 and 22, which are connected to each other.

FIGS. 7(a) through 7(c) simply show a pair of images I1 and I2 obtained by catching an object in the direction of the optical axis Lc of the optical instrument 1. FIG. 7(a) corresponds to the in-focus condition. FIG. 7(b) corresponds to the out-of-focus condition in which the focus is shifted to the front of the object. FIG. 7(c) corresponds to the out-of-focus condition in which the focus is shifted to the rear of the object. It is obvious from these drawings that the positions of the pair of images I1 and I2 in the front out-of-focus condition of FIG. 7(b) are respectively shifted by s/2 inwards from the reference positions thereof in the in-focus condition of FIG. 7(a) and that the positions of the pair of images I1 and I2 in the rear out-of-focus condition of FIG. 7(c) are respectively shifted by $-s/2$ outwards from the reference positions thereof in the in-focus condition of FIG. 7(a). Accordingly, if the relative positional shift s or $-s$ between the two images is detected, the degree and direction of the shift by reference to the in-focus condition of the optical instrument 1 can be known from the magnitude and sign thereof so that the image-pickup lens 2 can be adjusted to eliminate the shift.

FIG. 7(d) shows the in-focus condition in which pair of images are obtained by viewing an object in a direction making an inclination angle $\theta$ with respect to the optical axis Lc of the optical instrument 1 in the same manner as in FIG. 7(a). As is obvious from the drawing, the positions of these images are respectively shifted in the same direction and by the same shift amount sa from the positions of FIG. 7(a). That is, there is no difference between FIG. 7(d) and FIG. 7(a) insofar as the shift from the in-focus condition can be detected on the basis of the shift s from the reference positions of the two images. The reference positions of the two images, however, are shifted by sa in the case where the object is in the oblique direction.

Accordingly, as in the previous embodiment, combinations Ci of partial groups Ld and Rd are extracted from the pair of image data groups LD and RD by the extraction means 30 of FIG. 6 in the same manner as described above with reference to FIG. 4. For convenience, FIGS. 7(a) and 7(d) show the case where ranges of the partial groups Ld and Rd extracted by the extraction means 30 overlap with the images. The combinations C0 and C2 in FIG. 4 correspond to FIGS. 7(a) and 7(d), respectively. The shift amount sa from the reference positions of the images in FIGS. 7(a) and 7(d) corresponds to the number a of data required for shifting the positions of extraction of the two partial groups Ld and Rd in FIG. 4 for each combination Ci.

In the detection means 40, the shift value Si can be detected for each combination Ci of partial groups in the same manner as in the previous embodiment. Accordingly, the flow chart of FIG. 5 can be substantially applied to the operations of the extraction means 30 and the detection means 40 in this embodiment. Shift values Si are detected respectively for three combinations Ci (i=0 to 2) of partial groups by these two means, so that the shifts from the focusing condition of the optical instrument 1 with respect to objects in partial view fields having the direction of the optical axis and two directions of inclination angles $\theta$ are respectively detected in accordance with the value of the combination number i.

The operation of the object specifying means 60 may be the same as that in the previous embodiment. The object specifying means 60 receives these three shift values Si and specifies the object by selecting one of the three shift values Si according to the specifying standard designated by the setter 61. Thus, the object specifying means 60 outputs the shift value S corresponding to the object. The operation of the image-pickup lens control means 70 is, however, slightly different from that in the previous embodiment. The image-pickup lens 2 in this embodiment is subjected to closed-loop control to correct the shifting within an allowable range through the actuator 5 corresponding to the degree and direction of the shifting from the focusing condition represented by the shift value S.

In the TTL type optical instrument such as a single-lens reflex camera, a video camera, etc., an interchangeable lens or a zoom lens is usually used as the image-pickup lens 2 so that the focal length thereof can be switched or controlled. Therefore, it is preferable in the embodiment of FIG. 6 that a setter 32 for setting the inclination angle $\theta$ of the oblique-direction partial view field for the extraction means 30 is incorporated in a lens system of the image-pickup lens 2 as shown in the drawing to switch the setting of the angle $\theta$ for the extraction means 30 relative to the focal length or zoom rate of the image pickup lens 2.

It is to be understood that the invention is not limited to the aforementioned embodiments and that various changes thereof may be made. For example, it is advantageous in practical use to incorporate the optical means and the image sensor means in the optical instrument in the form of one module. Although in the aforementioned embodiments the extraction means and the detection means are provided for in the form of software, it is a matter of course that these means may be comprised of an electronic circuit and may be incorporated together with the image sensor means in an exclusive-use or application-specific integrated circuit device chip. In this case, the function for A/D conversion of image data may be further incorporated in the integrated circuit device chip to improve the total operation both in speed and in accuracy.

As described above, in the object detector according to the present invention, the following effects can be attained by: forming a pair of object images on an image sensor means through a pair of optical means receiving light from an object in a view field of an optical instrument to thereby generate a pair of image data groups; extracting, from the pair of data groups, a pair of partial groups corresponding to partial view fields having inclination angles arbitrarily designated with respect to the optical axis of the optical instrument, by an extraction means; detecting a shift value as a result of examination of a maximum correlation through a detection means by examining correlations while respectively successively shifting image data in the two partial groups to thereby use the shift value as an index representing the attribute of the object contained in the respective partial view field of the designated inclination angle; and further detecting shift values for three partial view fields having the direction of the optical axis and directions making positive and negative designated inclination angles with respect to the optical axis in the case where the optical instrument is of a triangular surveying type or a TTL type to thereby use the shift values as indexes representing the distances to objects in the respective partial view fields in the case of the triangular surveying type or as indexes representing the focusing conditions of the optical instrument to the objects in the case of the TTL type.

(a) The object can be detected within respective partial view fields with discrimination thereof while freely designating inclination angles of the partial view fields to detect the object. In the triangular surveying type or TTL type optical instrument, the object can be detected within three partial view fields having the direction of the optical axis of the optical instrument and directions of positive and negative variable inclination angles. Accordingly, missing of the object in the view field (a so-called center spoiling phenomenon) can be prevented, so that focusing accuracy can be improved.

(b) If necessary, the view field angle of the respective partial view field can be designated arbitrarily, so that accuracy in detection of the object can be greatly improved.

(c) As distinguished from the so-called focus-lock function, because the focus of the optical instrument can be adjusted to an object in an oblique direction it is not necessary to turn the optical instrument after adjusting the focus thereof to a desired object. Therefore, problems associated with unintentional movement of the hands and missing of shutter chances caused by the turning of the optical instrument can be solved.

(d) Because the operations of the extraction means and the detection means in the aforementioned embodiments are substantially the same in the triangular surveying type optical instrument and the TTL type optical instrument, a single object detector according to the present invention can be used in common to the two types of instruments, improving economy.

As described above, the present invention is remarkably effective at improving the focusing accuracy of the optical instrument, improving the handling property thereof and improving economy.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An object detector for an optical instrument comprising:

a pair of optical means for receiving light from an object in a view field of the optical instrument through different optical paths so as to form a pair of images of said object;

an image sensor means for receiving said pair of object images formed by said pair of optical means and for producing a pair of image data groups corresponding to said pair of object images;

an extraction means for respectively extracting from said pair of image data groups a pair of partial groups corresponding to partial view fields respectively having inclination angles with respect to an optical axis of said optical instrument; and a detection means for detecting a shift value representing a maximum correlation by examining respective correlations while successively relatively shifting image data in said pair of partial groups extracted by said extraction means, in which said shift value detected by said detection means while arbitrarily designating inclination angles of partial view fields to extract said pair of partial groups in said extraction means is detected as an index representing the attribute of said object contained in the respective partial view field with an inclination angle designated.

2. The object detector of claim 1, wherein said pair of optical means comprises a pair of lenses arranged with a predetermined distance therebetween.

3. The object detector of claim 1, wherein said image sensor means has a pair of image sensor portions arranged respectively to receive said object images corresponding to said pair of optical means.

4. The object detector of claim 1, wherein said image sensor means is comprised of a single image sensor means for receiving said pair of object images formed by said pair of optical means.

5. The object detector of claim 1, wherein said image data generated by said image sensor means are digital data composed of a plurality of bits.

6. The object detector of claim 1, wherein said pair of partial groups extracted by said extraction means have image data which are equal in number to each other.

7. An object detector for an optical instrument comprising:

a pair of optical means for receiving light from an object in a view field of the optical instrument through different optical paths so as to respectively form a pair of images of said object;

an image sensor means for receiving said pair of object images formed by said pair of optical means so as to generate a pair of image data groups corresponding to said pair of object images;

an extraction means for forming three pairs of partial groups by respectively extracting, from said pair of image data groups, partial groups respectively corresponding to a partial view field in the direction of an optical axis of said optical instrument and two-directional partial view fields having positive and negative inclination angles with respect to said optical axis of the optical instrument; and a detection means for respectively detecting shift values representing maximum correlations by examining respective correlations while successively relatively shifting image data in each pair of partial groups with respect to said pairs of partial groups extracted by said extraction means, characterized in that said shift values detected corresponding to said three pairs of partial groups by said detection means, while arbitrarily designating inclination angles of partial view fields with respect to said optical axis of the optical instrument for extracting said partial groups in said extraction means, are respectively detected as indexes representing distances from said optical instrument, of said object contained in the respective partial view fields corresponding to the respective pairs of partial groups.

8. The object detector of claim 7, wherein said inclination angles of partial view fields, with respect to said optical axis of said optical instrument for extracting said partial groups in said extraction means, are designated to have equal values with respect to the positive and negative directions.

9. An object detector for an optical instrument comprising:
   a pair of optical means for receiving light from an object in a view field of said optical instrument through an image-pickup lens thereof and through different optical paths so as to form a pair of object images;
   an image sensor means for receiving said pair of object images formed by said pair of optical means so as to generate a pair of image data groups corresponding to said pair of object images;
   an extraction means for forming three pairs of partial groups by respectively extracting, from said pair of image data groups, partial groups respectively corresponding to a partial view field in the direction of an optical axis of said optical instrument and two directional partial view fields having positive and negative inclination angles with respect to said optical axis of said optical instrument; and
   a detection means for respectively detecting shift values, representing maximum correlations by examining respective correlations while successively shifting image data in each pair of partial groups with respect to said pairs of partial groups extracted by said extraction means, in which said shift values detected corresponding to said three pairs of partial groups by said detection means while arbitrarily designating inclination angles of partial view fields with respect to said optical axis of the optical instrument to extract said partial groups in said extraction means, are respectively detected as indexes representing focusing conditions of said image-pickup lens of said optical instrument with respect to said object contained in the respective partial view fields corresponding to the respective pairs of partial groups.

10. The object detector of claim 9, wherein said inclination angles of partial view fields, with respect to said optical axis of said optical instrument for extracting said partial groups in said extraction means, are designated to have equal values with respect to the positive and negative directions.

11. The object detector of claim 9, wherein said inclination angles of partial view fields, with respect to said optical axis of said optical instrument for extracting said partial groups in said extraction means, are designated corresponding to the focal length of said image-pickup lens of said optical instrument.

12. The object detector of claim 9, wherein said image-pickup lens comprises a zoom lens in which the designation of said inclination angles of partial view fields varies relative to the zoom rate thereof.

* * * * *